(12) United States Patent
Riza

(10) Patent No.: US 8,107,056 B1
(45) Date of Patent: Jan. 31, 2012

(54) HYBRID OPTICAL DISTANCE SENSOR

(75) Inventor: Nabeel A. Riza, Oviedo, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 318 days.

(21) Appl. No.: 12/560,667

(22) Filed: Sep. 16, 2009

Related U.S. Application Data

(60) Provisional application No. 61/097,589, filed on Sep. 17, 2008.

(51) Int. Cl.
*G01C 3/08* (2006.01)

(52) U.S. Cl. ..................................... 356/4.05

(58) Field of Classification Search ............... 356/4.05
See application file for complete search history.

(56) References Cited

U.S. PATENT DOCUMENTS

| | | | |
|---|---|---|---|
| 3,902,803 A | 9/1975 | Lego, Jr. | |
| 4,105,332 A | 8/1978 | Hohne, Jr. | |
| 4,584,704 A * | 4/1986 | Ferren | 382/255 |
| 4,950,880 A * | 8/1990 | Hayner | 250/201.9 |
| 5,260,727 A * | 11/1993 | Oksman et al. | 351/162 |
| 5,686,960 A * | 11/1997 | Sussman et al. | 348/218.1 |
| 5,764,360 A | 6/1998 | Meier | |
| 6,057,925 A * | 5/2000 | Anthon | 356/419 |
| 6,191,881 B1 * | 2/2001 | Tajima | 359/254 |
| 6,741,343 B2 | 5/2004 | Schafer et al. | |
| 6,753,950 B2 | 6/2004 | Morcum | |
| 6,829,043 B2 | 12/2004 | Lewis et al. | |
| 6,833,909 B2 | 12/2004 | Schmidt et al. | |
| 6,876,441 B2 | 4/2005 | Barker | |
| 6,917,415 B2 | 7/2005 | Gogolla et al. | |
| 7,221,435 B2 | 5/2007 | Stierle | |
| 7,233,279 B2 | 6/2007 | Moriya | |
| 7,315,355 B2 | 1/2008 | Sperber | |
| 7,324,218 B2 | 1/2008 | Stierle et al. | |
| 7,359,039 B2 | 4/2008 | Kloza | |
| 7,388,810 B2 | 6/2008 | Campbell | |
| 7,728,987 B2 * | 6/2010 | Arnold et al. | 356/511 |
| 2003/0035460 A1 * | 2/2003 | Tsikos et al. | 372/101 |
| 2003/0231293 A1 * | 12/2003 | Blum et al. | 356/5.01 |
| 2004/0090604 A1 * | 5/2004 | Childers et al. | 353/122 |
| 2004/0114203 A1 * | 6/2004 | Batchko | 359/3 |
| 2006/0164593 A1 * | 7/2006 | Peyghambarian et al. | 349/200 |
| 2006/0245748 A1 * | 11/2006 | Chuang et al. | 396/89 |

OTHER PUBLICATIONS

Sahu, O. P., Gupta, A. K., Measurement of Distance and Medium Velocity Using Frequency-Modulated Sound/Ultrasound, IEEE Trans. on Inst, and Meas., 2008, pp. 838-842, vol. 57, No. 4. Abstract.

(Continued)

*Primary Examiner* — Thomas Tarcza
*Assistant Examiner* — Antoine J Bedard
(74) *Attorney, Agent, or Firm* — Brian S. Steinberger; Phyllis K. Wood; Law Offices of Brian S. Steinberger, P.A.

(57) ABSTRACT

Methods and systems for a hybrid optical device for high dynamic range high resolution remote sensing of object distance, object motion displacement, object three dimensional structure, object spatial profile, and measurement of liquid levels, and different matter interface positions. The device uses a hybrid digital-analog controlled variable focal length lens system to target both specular and diffuse objects. The spatial processing methods and systems can include time-frequency processing optical distance measurement methods to enable a robust hybrid-technique sensor.

19 Claims, 6 Drawing Sheets

OTHER PUBLICATIONS

Norgia, m., Giuliani, G., Donati, S., Absolute Distance Measurement with Improved Accuracy Using Laser Diode Self Mixing Interferometry in a Closed Loop, IEEE Trans. on Inst. And Meas., 2007, pp. 1894-1900, vol. 56, No. 5. Abstract.

Baetz, W., Braasch, J., Holzapfel, W., Noise-Modulated Optomechatronic Distance-Measuring Systems, IEEE Trans. on Industrial Elec., 2005, pp. 944-952, vol. 52, No. 4. Abstract.

Lu, M. C., Wang, W. Y., Chu, C. Y., Image-Based Distance and Area Measuring Systems, IEEE Sensors hour, 2006, pp. 495-503, vol. 6, No. 2. Abstract.

Amann, M. C., Bosch, T., Lescure, M., Myllyla, R., Rioux, M., Laser Ranging: a Critical Review of Usual Techniques for Distance Measurement, Opt. Eng. 2001, vol. 40., No. 10. Abstract.

De Groot, P., Unusual Techniques for Absolute Distance Measurement, opt. Eng., 2001, pp. 28-32, vol. 40 No. 1. Abstract.

Wiegmann, A., Schulz, M., Elster, C., Absolute Profile Measurements of Large Moderately Flat Optical Surfaces with High Dynamic Range, Opt. Express, 2008, pp. 11975-11986, vol. 16.

Malacara, D., Optical Shop Testing, (John Wiley & Sons, Inc., 1992)

Freimann, R., Dorband, B., Holler, F., Absolute Measurement of Non-Comatic Aspheric Surface Errors, Opt Commun, 1999, pp. 106-114, vol. 161. Abstract.

Reichelt, S., Tiziani, H. J., Twin-CGHs for Absolute Calibration in a Wavelength Testing Interferometry, Opt Commun, 2003, pp. 23-32, vol. 220. Abstract.

Reichelt, S., Pruss, C.,. Tizizani, H. J., Absolute Testing of Aspheric Surfaces, Optical Fabrication, Testing and Metrology, 2004, pp. 252-263 vol. 45. Abstract.

Simon, F., Khan, G., Mantel, K., Lindlein, N., Schwider, J., Quasi-Absolute Measurement of Aspheres with a Combined Diffractive Optical Element as a Reference, Appl. Opt., 2006, pp. 8606-8612, vol. 45. Abstract.

Sjoedahl, M., Oreb, B. F., Stitching Interferometric Measurement Data for Inspection of Large Optical Components, Opt. Eng., 2002, pp. 403-408, vol. 41. Abstract.

Elster, C., Weingrtner, I., Schultz, M., Coupled Distances Sensor System for High-Accuracy Topography Measurement: According for Scanning Stage and systematic Sensor Errors, Prec. Eng., 2006, pp. 2-38, vol. 30, No. 2. Abstract.

Schulz, M., Elster, C., Traceable Multiple Sensor System for Measuring Curved Surface Profiles with High Accuracy and High Lateral Resolution, Opt. Eng., 2006, pp. 060503-1-060503-3, vol. 45. Abstract.

Williams C. C., Wickramasinghe, H. K., Absolute Optical Ranging with 200-nm Resolution, Opt. Lett., 1989, pp. 542, vol. 14. Abstract.

Rovati, L., Minoni, U., Docchio, F., Dispersive White Light Combined with a Frequency-Modulated Continues-Wave Interferometer for High-Resolution Absolute Measurements of Distance, Opt. Lett., 1997, pp. 850-852, vol. 22. Abstract.

Rovati, L., Minoni, U., Bonardi, M., Docchio, F., Absolute Distance Measurements Using Comb-Spectrum Interferometry, IOP Journal of Optics, 1998, pp. 121-127, vol. 29. Abstract.

Czarske, J., Mobius, J., Moldenhauer, K., Mode-Locking External-Cavity-Laser-Diode Sensor for Displacement Measurements of Technical Surfaces, Appl. Opt., 2005, pp. 5180-5189, vol. 44. Abstract.

Pfister, T., Buttner, L., Shirai, K., Czarske, Monochromatic Heterodyne Fiber-Optic Profile Sensor for Spatially Resolved Velocity Measurements with Frequency Division Multiplexing, Appl. Opt., 2005,pp. 2501-2510, vol. 44. Abstract.

Kervevan, K., Gilles, H., Girard, S., Laroche, M., Monfort, Y., Absolute Distance Measurement with Heterodyne Optical Feedback on a Yb:Er Glass Laser, Appl. Opt., 2006, pp. 4084-4091, vol. 45.

Gouaux, F., Servagent, N., Bosch, T., Absolute Distance Measurement with and Optical Feedback Interferometer, Appl. Opt., 2006, pp. 6684-6689, vol. 37. Abstract.

Joo, K., Kim, S., Absolute Distance Measurement by Dispersive Interferometry using a Femtosecond Pulse Laser, Opt. Express, 2006, pp. 5954-5960, vol. 14. Abstract.

Yoshida, M., Nakmura, K., Hiromasa, I., Long Distance Measurement with High Spatial Resolution by Optical Frequency Domain Reflectometry using Frequency Shifted Feedback Fiber Laser., OSA CLEO Conf., Digest, 2000. Abstract.

Mehta, D. S., Singh, P., Faridi, M. S., Mirza, S., Shakher, C., Distance Measurement with Extended Range using lateral Shearing Interferometry and Fourier Transform Fringe Analysis, Opt. Eng. 2005, pp. 063602, vol. 44, No. 6. Abstract.

Salvade, Y., Schuhler, N., Leveque, S., Le Floch, S., High Accuracy Absolute Distance Measurement Using Frequency Comb Referenced Multiwavelength Source, Appl. Opt., 2008, pp. 2715-2720, vol. 47. Abstract.

Chu, J., Kim, S., Absolute Distance Measurement by Lateral Shearing Interferometry of Point-Diffracted Spherical Waves, Opt. Express, 2006, pp. 5961-5967, vol. 14, Abstract.

Nemecek, A., Oberhauser, K., Seidl, C., Zimmermann, H, PIN-diode Based Optical Distance Sensor for Low Optical Power Active Illumination, Sensors IEEE, 2005, pp. 4-30, Abstract.

Harada, M., Doi, M., Iwasaki, Y., A Novel Distance Measurement System with a Planar Lightwave Circuit,Jpn. J. Appl. Phys., 2002, pp. 4806-4808, vol. 41. Abstract.

Danisch, L. A., Removing Index of Refraction Constraints in the Optical Measurement of Liquid Level Proc. Spie, 1993, pp. 268-279.

Vazquez, C,. Gonzalo, B. A., Gonzalo, S., Vargas, S., Montalvo, J., Multi Level-Sensor System using Plastic Optical Fibers for Intrinsically Safe Level Measurements, SEns. Actuators, AA, 2004, pp. 22-32, vol. 6 No. 1, Abstract.

Yan-Bing, L., Yong-Hua, Y., Optical Remote Measurement of liquid Level, Proc. SPIE , 1993, pp. 1004-1007, vol. 2101, Abstract.

Khaliq, S., James, S. W., Tatam, R. P., Fiber-Optic Liquid-Level Sensor using a Long Period Grating, Opt. Lett., 2001, pp. 1224-1226, vol. 26 No. 16, Abstract.

Perez-Ocon, F., Rubino, M., Abril, J. M., Casanova, P., Martinez, J. A., Fiber-optic Liquid-Level Continuous Gauge, Sens. Actuators, 1992, pp. 161-164, vol. A A35, No. 2, Abstract.

Ilev, I. K., Waynant, R. W., All-Fiber-Optic sensor for Liquid Level Measurement, Rev. Sci., 1999, pp. 2551-2554, vol. 70, No. 5, Abstract.

Ren, L., Yu, Q., High Accuracy Fiber Optic Level Sensor, Proc. SPIE, 2002, pp. 362-366, vol. 4920, Abstract.

Yang, C., Chen, S., Yang, G., Fiber Optical Liquid Level Sensor Under Cryogenic Environment Sens. Actuators, 2001 pp. 69-75, vol. A A94, No. 1, Abstract.

P. Raatikainen, Kassamakov, I., Kakanakov, R., Luukkala; M., Fiber Optic Liquid Level Sensor, Sens. Actuators, 1997, pp. 93-97, vol. A A58, No. 2, Abstract.

Romo-Medrano, K. E., Khotiaintsev, S. N., An Optical-Fiber Refractometric Liquid-Level Sensor for Liquid Nitrogen, Meas. Sci. Technol., 2006, pp. 998-1004, vol. 17, No. 5, Abstract.

Betta, G., Pietrosanto, A., Scaglione, A., A Gray-Code-Based Fiber optic Liquid Level Transducer, IEE Trans. Instrum. Meas., 1998, pp. 174-178, vol. 47, No. 1, Abstract.

Chandani, S. M., Jaeger, N. A. F., Optical Fiber Liquid Level Sensor. Optical Engineering, 2007, pp. 114401, vol. 46, No. 11. Abstract.

\* cited by examiner

HYBRID OPTICAL DISTANCE SENSOR

This application claims the benefit of priority to U.S. Provisional application No. 61/097,589 filed on Sep. 17, 2008.

FIELD OF THE INVENTION

This invention relates to optical distance sensors and, in particular, to methods, systems and apparatus for a hybrid optical distance sensor for high dynamic range high resolution remote distance or level measurements.

BACKGROUND AND PRIOR ART

Optical distance sensors measure the distance of a given target from a reference spot such as the position of the measuring sensor. Various distance measurements sensors have been developed over the years that involve a variety of technologies including ultrasonics, the use of sound waves, microwave/millimeter wave radar using pulsed radio frequency energy, and more recently, laser radar using electrically modulated optical energy.

Distance sensors are vital for numerous applications such as industrial non-destructive testing, reverse engineering, virtual reality, machined parts quality controls, machinery operations, civil engineering, architecture, and design and testing of large to micro-sized structures.

A specific application of a distance measurement sensor is a liquid level measurement device. Optical liquid level sensors can be basically divided into two classes. Intrusive optical fiber-based sensors that have direct interaction with the liquid and remote laser radar type sensors based on pulsed lasers and temporal signal processing of sampled received data.

The optical method for distance measurement is a preferred method in clear line-of-sight measurement and testing cases with optically specular (or retroreflective) or diffused (optically scattering) targets as laser beams can have high power, low divergence, ultra-short pulse widths, and small far-field spots due to the small (e.g., micron) wavelength size. In effect, distance along z-direction measurements can be conducted over long distances with high spatial resolutions, along x and y coordinates of an x-y-z Cartesian coordinate system, leading to accurate three-dimensional profiles of a target surface or structures.

Today, temporal/frequency processing of the electrically/optically modulated laser beams is used to deduce the distance/profile of the target under observation. For example, a continuous wave laser beam is amplitude modulated by a short pulse waveform of a given pulse wide and a given Pulse Repetition Frequency (PRF). The PRF sets the maximum distance the sensor can measure while the pulse width sets the best distance measurement resolution. To measure over long distances, the PRF rate is lowered while for better resolution, the pulse width is shortened. Low PRFs means a slow sensor response time while a shorter pulse (e.g., going from microseconds to nanoseconds) implies broader instantaneous bandwidth electrical processing of the received signal making the electronic hardware considerably more expensive. With ultra-short (e.g., picoseconds) laser pulses, this situation on wideband processing is further exacerbated as special electronics is required for processing. In addition, ultrashort pulse optical radiation means the optical spectrum is broad and in effect, target response over the spectrum can be different. In short, today, relative distance measurements over wide ranges and high resolution requires expensive and spectrum sensitive temporal electrical processing. Although some laser beam processing methods including speckle interferometry have been used for relative distance measurements such as in surface profiling of target objects like large mirror optics or turbine engine blades, unlike laser radar, these methods have a restricted dynamic range for relative distance measurement. Fundamentally, all optically or electrically interferometric methods are very sensitive to external (optical path or target motion) or laser phase noise, limiting the operational robustness of such distance sensors. More recently, self-modulation interferometry of laser beams has also been tested showing improved robustness to interferometric noise. Nevertheless, all these laser time-frequency modulation methods of laser-based distance sensing add cost to the overall sensor system.

What is needed to solve the problems association with the previously described prior art is a relative distance sensor that has high distance dynamic range, excellent distance measurement resolution, high spatial profiling resolution, and low cost. The present invention is a remote optical distance sensor that does away with the limitations associated with the classic laser radar temporal/frequency processing approach. Specifically, a novel remote distance measurement hybrid optical sensor is described using smart agile laser beam optics and robust spatial optical processing leading to the desired powerful distance sensor.

SUMMARY OF THE INVENTION

A primary objective of the invention is to provide methods, apparatus and systems for hybrid optical sensor designs for high dynamic range high resolution remote distance or level measurements.

A second objective of the present invention is to provide methods, apparatus and systems for a relative distance sensor that has high distance dynamic range, excellent distance measurement resolution, high spatial profiling resolution, and low cost.

A third objective of the present invention is to provide methods, apparatus and systems for hybrid optical sensor designs that allows remote sensing of object distance, object motion displacement, object three dimensional structure, object spatial profile, and measurement of liquid levels, and different matter such as gas-liquid, solid-gas, liquid A-liquid B interface positions.

A fourth objective of the invention is to provide methods, apparatus and systems for a preferred sensor using a hybrid digital-analog controlled variable focal length lens system to target both specular (retroreflective) and diffuse objects. The digitally switched lens provides the desired bias lens power to place the far field optical focus spot (or minimum beam waist) near the target location. The analog controlled variable focus lens then is adjust to fine tune the location of the focused spot on the desired target surface.

A fifth objective of the invention is to provide methods, apparatus and systems for a distance sensors that allow remote sensing of object distance, object motion displacement, object three dimensional structure, object spatial profile, and measurement of liquid levels, and different matter (gas-liquid, solid-gas, liquid A-liquid B) interface positions.

A sixth objective of the invention is to provide methods, apparatus and systems for a distance sensors with tip-tilt and x-y motion controls that allows proper retro-reflective targeting of a given object position within a target zone. By full x-y motion of transmit-receive module, 3-D reconstruction of an illuminated target is possible.

A seventh objective of the invention is to provide methods, apparatus and systems for a distance sensors that can be used to estimate the level of liquids as a gas-liquid interface produces a Fresnel reflection interface for a targeting beam to form a specular reflection surface. Pressure, displacement, and stress sensors can also be constructed by measuring object motion using the subject non-contact optical distance sensors. In civil engineering, building architecture, and industrial design, the proposed distance sensors can be used to monitor the health and engineering precision/quality of bridges, sky scrapers, ships, aircrafts, and other large structures. The distance sensors can also be used on a smaller scale for micro-machined parts that may even have nano-scale structures.

A first embodiment provides a variable focal length targeting optical device that includes a laser to generate a laser beam, an optical device and a hybrid lens having a controllable digital variable focal length lens and a controllable analog variable focal length lens to transmit the laser beam toward the target. A processing device connected with the controllable digital and analog variable focal length lenses controls the variable focal length to the target and an optical receiver receives the returning direct or indirect beam remote sensing of target distance, target motion displacement, target three-dimensional structure, target spatial profile and measurement of target liquid levels. The variable focal length targeting optical device can include a motion control device for adjusting the tip/tilt and the x-y motion stages of the variable focal length targeting optical device for three-dimensional reconstruction or profiling of the target where z is the direction of the laser beam directed toward the target.

The optical device can be a beam splitter for transmitting a portion of the laser beam to the hybrid lens toward the target and reflecting the other portion of the laser beam toward the optical receiver and receiving a reflected return beam from the target and deflecting the reflected return beam toward the optical receiver where the distance being measured from the target reflective normal incidence to the laser beam transmission exit position at the hybrid lens. The optical receiver used with the beam splitter an be a camera, an optical imager or a photo detector to receive the reflected portion of the laser beam from the beam splitter and the return reflected beam from the target, the return reflected beam retracing the transmit beam path. Alternatively, the optical device can be a collimating lens to collimate the beam from the lasing device and can include polarizers to polarize the transmitted laser beam.

A second embodiment provides a method to remotely sense a target distance, target displacement, target three dimensional structure, target spatial profile and a measurement of target liquid levels. The method includes generating a laser beam directed toward the target, generating first control signal n and second control signal k, controlling a variable digital focal length and a variable analog focal length of the path of the laser beam transmitted toward the target with the first control signal n and second control signal k, respectively, where n and k vary to N and K, respectively, each combination of n and k variable control signals being a different focal length position, detecting at least one of a reflected portion of the laser beam and a return light from the target to determine when the transmitted laser beam illuminates the target, and measuring one of the target distance, target displacement, target three dimensional structure, target spatial profile and a measurement of target liquid levels according to the control signal n and the control signal k.

The controlling step can include transmitting a portion of the laser beam toward the target subjected to the measurement, reflecting the other portion of the laser beam toward an optical receiver for the measurement step and deflecting a reflected return beam from the target to the optical receiver for the measurement step. The measurement can include monitoring the reflected laser beam to detect a minimum size at the optical receiver, monitoring the return light from the target and determining the first control signal n and second control signal k to measure the target distance or target displacement. The method can also include varying an x and y position of the laser beam transmitted toward the target to measure one of the target three dimensional structure, target spatial profile and measurement of target liquid level where a is the direction of the laser beam directed toward the target.

Further objects and advantages of this invention will be apparent from the following detailed description of preferred embodiments which are illustrated schematically in the accompanying drawings.

DESCRIPTION OF THE PREFERRED EMBODIMENTS

Figure 1:
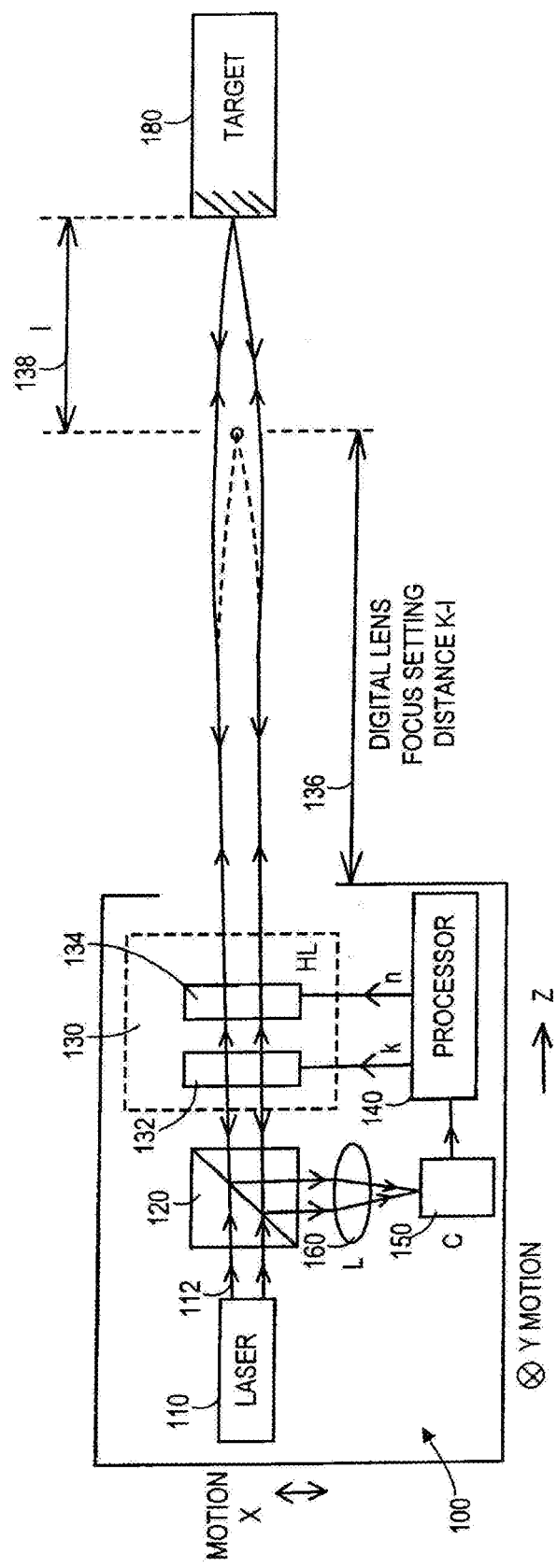
FIG. 1 is an optical block diagram showing a hybrid lens distance sensor for reflective targets according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | laser transmit-receive (T/R) module |
| 105 | modulation electronics |
| 110 | laser |
| 112 | laser beam |
| 120 | beamsplitter |
| 123 | p-polarization polarizer |
| 125 | collimating lens |
| 127 | s-polarization polarizer |
| 129 | quarter-wave plate |
| 130 | hybrid lens |
| 132 | digitally variable lens |
| 134 | analog variable lens |
| 136 | digital lens distance |
| 138 | analog lens range |

| | |
|---|---|
| 140 | processor |
| 145 | motion controller |
| 150 | optical imager |
| 160 | spherical lens |
| 162 | pin hole |
| 167 | photo-detector |
| 170 | camera |
| 180 | target |
| 185 | tilting mirror |
| 190 | disk |

FIG. 1 shows the preferred embodiment hybrid lens-based distance sensor shown in operation for optically reflective targets. The laser transmit-receive module 100 having tip and tilt motion includes an optical transmitter such as a laser 110 producing a collimated laser beam 112, a beam splitter 120 and a hybrid lens 120 optically aligned to transmit the laser beam 110 toward the target 180. The hybrid lens includes a digitally variable focal length lens 132 and an analog variable focal length lens 134. The transmit-receive module 100 connected with a processor 140 for controlling the hybrid lens and a two-dimensional optical imager 150. Optionally the transmit-receive module also includes a spherical lens 160 combination for receiving the portion of the laser beam 110 reflected by the beam splitter 120.

A portion of the collimated optical beam 112 from the laser 110 passes through the beam splitter 120 and the hybrid lens 130 towards the target 180 subjected to a distance measurement. Distance is measured from the target reflective normal incidence, or retro-reflective target surface to the beam transmission exit position at the hybrid lens 130. In the example shown in FIG. 1, the hybrid lens 130 includes a variable focal length digital lens 132 optically aligned with a variable focal length analog lens 134 to form a high dynamic range and high resolution variable focal length targeting optical system. The digital lens 132 is controlled by a control signal labeled as k that varies from k=1, 2, 3, to K, producing K different focal length positions for the laser beam 110 engaging the target 180. The focal length resolution of the variable digital lens 132 is designed to be equal to the Δl variable focus range of "l" where l=n·Δl with n=1, 2, 3, . . . , N, where N is the number of analog lens settings. Thus, the analog lens has N different focus positions. In total, the hybrid lens 130 produces K times N variable focal length positions implying K·N independent distance positions that can be measured by the sensor. In effect, both a high dynamic range and high resolution distance measurement is accomplished as the digital lens 132 gives the distance measurement dynamic range while the analog lens 134 gives the distance measurement fine resolution.

The digital lens 132 focal length is adjusted so that the laser beam forms a minimum beam waist, or focused beam spot on the target 180 located at an unknown distance. Determining when the target is illuminated by a focused beam is accomplished by monitoring the laser beam spot on the returning reflected beam observed by a Camera C, or optical imager such as a CCD. A spherical focus lens 160 produces a spot on the camera 150 where the spot size changes depending on the hybrid lens focal length. A high resolution camera 150 and electronic image processing techniques are used estimate the beam spot size to determine when the size is a minimum. As the hybrid lens focal length is changed, the spot swings from a larger spot to a smaller spot to a larger spot.

The goal of the distance sensor is to find the hybrid lens drive conditions k and n when the spot on the optical camera 150 forms a minimum size. In other words, when the target 180 is illuminated with a focused beam spot on the target surface, the retro-reflected beam coming back to the laser transmit-receive module 100 also retraces the transmit beam path and hence produces a collimated beam after passing through the hybrid lens 130 to produce the tightest (i.e., smallest) spot on the optical camera 150.

One major benefit of this distance sensor operation is that the spatial resolution of the beam on the target surface is the smallest when the target distance is measured. In effect, the target zone can be spatially sampled with higher spatial resolution, a feature not possible with prior art distance sensors where the beam continues to follow natural beam expansion via free-space propagation beam diffraction. In prior art sensors, the beam size on the target is different for different distances, giving non-uniform spatial sampling sizes. In the present invention, this issue of changing and large beam sizes on target is essentially eliminated.

The target distance is estimated by noting what values of k and n are used to drive the digitally variable lens and analog variable lens, respectively. FIG. 1 also shows the transmit-receive module 100 with tip-tilt and x-y motion controls that allows proper retro-reflective targeting of a given object position within a target zone. By full x-y motion of transmit-receive module, 3-D reconstruction of an illuminated target is possible. The interconnected computer processor 140 controls the digitally variable lens and analog variable lens (and the tip/tilt and x-y motion stages) and processes camera 150 image data to conclude an accurate absolute distance measurement for the target object.

Depending on the application and distance measurement requirements, the optical lenses implemented by digitally variable lens 132 and analog variable lens 134 as shown in FIG. 1 are convex lenses of desired Dioptric powers. For example, the distance sensor dynamic range could be 10 meters with a 1 mm resolution giving a total of 10,000 distance measurement ranging bins. The system could also be designed for a shorter dynamic range of 20 cm with a 10 micron resolution, again giving a large 20,000 range resolution bins. The performance of the sensor depends of the digitally variable lens and analog variable lens technology and its control sensitivity along with laser beam properties. Sub-micron (or sub-wavelength) resolutions are possible using special dioptric power digitally variable lens and analog variable lens optics combined with prior-art interferometric distance sensing methods.

When reading the dioptric (1/focal length) powers of both the deployed digital control and analog control lenses, one can determine the distance of the target from the optical transmitter. To determine whether the target beam is adjusted to its best focus position on the target, two methods of target observation can be used. Specifically, spatial image processing via an optically sensitive electronic imager chip that records the direct (specular) or indirect (scattered) light coming from the target is deployed. In other words, if the target is retro-reflective or high reflectivity per spatial focused spot, the laser light returns along the same path back to the transmit-receive module to be viewed by a camera or point detector.

By reading the received beam size or power, one can conclude whether the light is focused on the target. Then one can read the hybrid analog-digital lens powers to determine the target distance. Note that because proper sensor operation requires light to be focused on the target, the sensor inherently exposes the target to the smallest far-field optical spot possible. This means the spatial resolution of the observed target is also the best possible for the given target distance, thus forming a sensor that provides both excellent distance resolution and excellent spatial resolution, a powerful feature of the proposed sensor. The sensor configurations of the present invention allow remote sensing of object distance, object motion displacement, object three dimensional structure, object spatial profile, and measurement of liquid levels, and different matter (gas-liquid, solid-gas, liquid A-liquid B) interface positions.

In FIG. 1, off-axis placement of the receive beam optics can also be deployed given the distance range requirements because returning beam sizes can be bigger than the hybrid lens aperture for effective capture and hence direct capture and observation of returning beam.

A variety of lasers can be used in the sensor of the present invention, including wavelength ranges from the visible to the near infrared, e.g., 405 nm to 10.6 microns. In principle, the same concepts can be applied to all electromagnetic waves include radar band and Tera-Hertz radiation. In this case, the variable analog lens and variable digital lens can be formed by a variety of technologies, including phased array antennas to form 3-D beam focusing of the EM waves. Ultrasound can also be deployed to implement the optical distance sensor concept, in this case, the variable analog lens and variable digital lens formed by ultrasound phased array transducer device. For the present distance optical sensor, a variety of variable analog lens technologies can also be used such as electrically and optically controlled liquid crystal lenses, electrically and mechanically controlled liquid lenses, and micro-machined or MEMS-based electrically actuated variable focus optical lenses.

A typical design of a liquid lens is based on the electro-wetting process using two different liquids encased in a cavity. Change in voltage causes the boundary of the two liquids to behave as a lens-like curvature. Electrically controlled variable focal length lenses have been used for a variety of applications including, but not limited to, free-space communications, confocal microscopy, optical chip device inspection and height profiling.

The hybrid lens distance sensor of the present invention can be configured with different types of controllable variable digital lenses without deviating from the scope of the invention. FIGS. 2 through 5 show examples of alternative controllable variable digital lenses, but is not intended to include all possible controllable variable digital lens configurations. Those skilled in the art will recognize that other controllable variable digital lens configurations can also be substituted.

Figure 2:
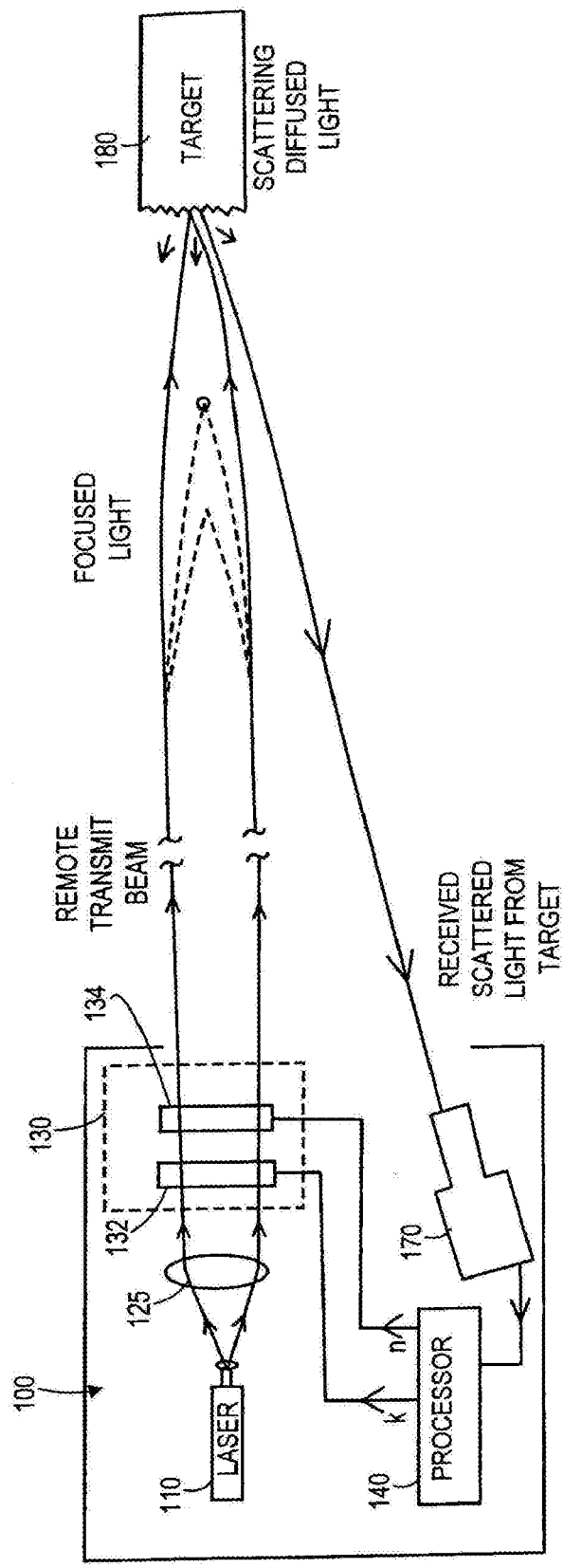
FIG. 2 is a block diagram showing a hybrid lens distance sensor for optically scattering or diffused targets.

FIG. 2 shows a hybrid lens-based distance sensor for optically scattering or diffused targets. In this case, light from the laser 110 first is collimated by collimating lens 125 and passes through the hybrid lens 130. The laser beam transmitted to a target 180 is not retro-reflected back along the transmission path. Instead, light striking the target 180 scatters off in many directions, including the location very near the transmitter where an optical camera 170 with an imaging lens is positioned to look at the illuminated target. Thus, as the hybrid lens 130 is tuned by changing k and n signals from the processor 150 for driving the variable digital lens 132 and the variable analog lens 134, the camera 170 watches the target 180 to note when the observed target 170 is exposed by the tightest or smallest focus laser beam spot. When this tight spot is observed, k and n control signal are noted and the processor 140 computes the target distance. The power of the laser 110 can be adjusted based on the type of target surface, sensitivity of the camera, and distance of target from transmit-receive module 100. FIG. 2 also shows dotted transmit beam laser light focused to different positions along the beam optical axis as hybrid lens 130 is tuned.

Figure 3:
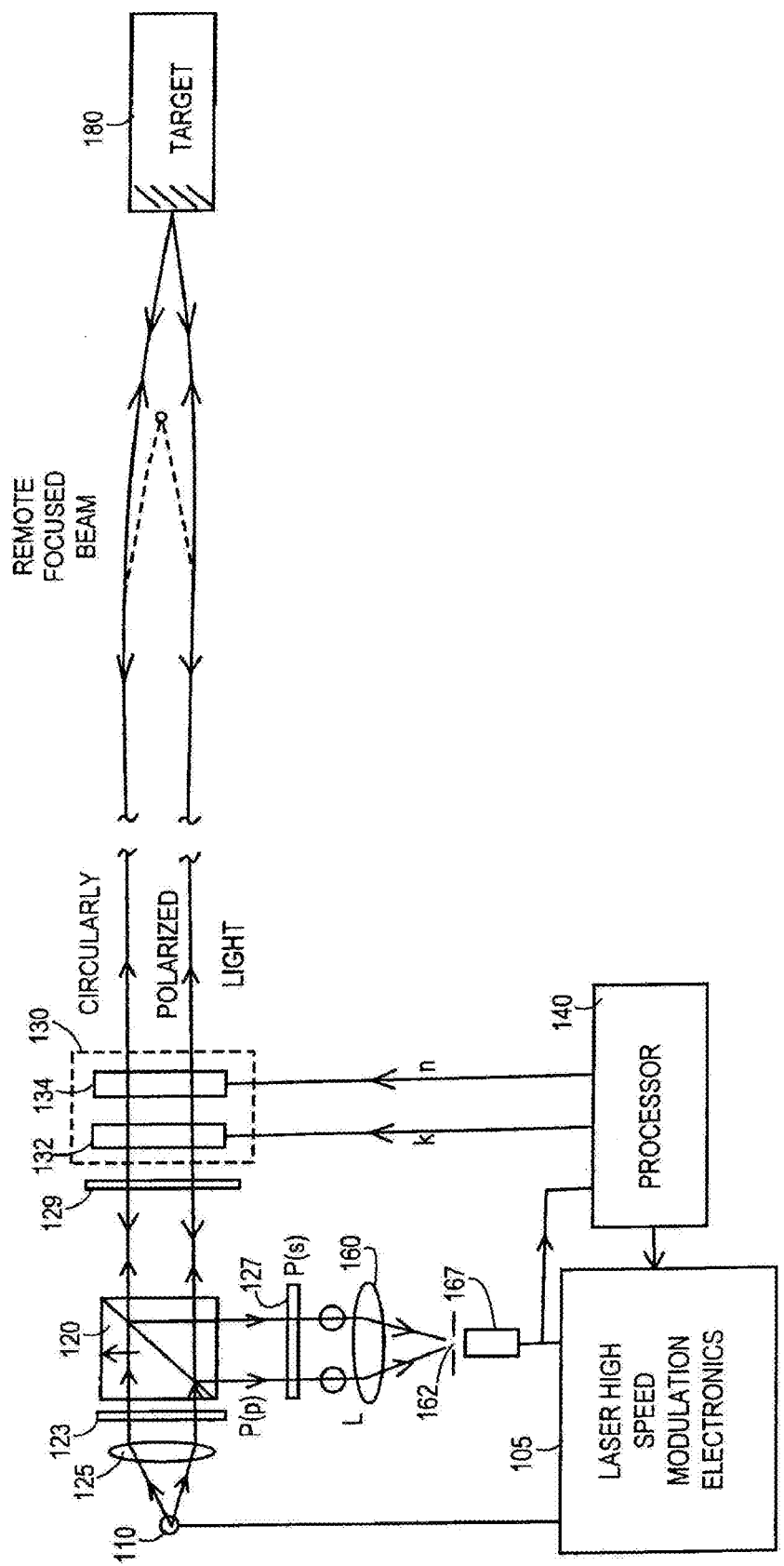
FIG. 3 is a block diagram showing a hybrid space-time processing distance sensor according to the present invention.

An alternate sensor design combines the preferred spatial processing sensor design with time-frequency processing optical distance measurement methods to enable a fully robust hybrid-technique sensor with powerful overall capabilities. FIG. 3 shows a hybrid space-time processing distance sensor with the laser temporally/frequency modulated by high speed drive electronics 105 to implement distance sensing using time-frequency processing methods plus distance sensing spatial processing method according to the present invention. The laser 110 can be a high power high speed laser diode optically aligned with the collimating lens 125. The collimated beam is polarized by a p-polarization polarizer 123 before striking the polarization beam splitter 120 to separate the transmit (T) and receive (R) channels. A portion of the beam is transmitted toward the hybrid lens 130 while the reflected beam is s-polarized by the s-polarization polarizer 127. The polarized reflected beam then passes through to spherical lens 160 which focuses the polarized reflected beam on the pin hole 162 that directs the beam onto a photo-detector 167. In the configuration shown, the photo diode can be a high speed point photo detector. The polarized beam transmitted by the polarized beam splitter passes through a quarter wave plate 129 and adjacent hybrid lens 130 converts the laser linear p or horizontal polarization light to circular polarized light for transmission that is transmitted to the target 180.

The optical configuration shown in FIG. 3 uses horizontal and vertical polarization optics to enable an optically efficient structure using a laser 110 with linear polarization output and a polarization beam splitter 120 to separate the transmit and receive channels. While the quarter-wave plate 129 is shown between the polarization beam splitter 120 and the hybrid lens 130, alternatively the quarter lens plate 129 can be placed after the hybrid lens 130 to produce the circularly polarized light.

The returning retro-reflected light again passes through the quarter wave plate 129 to become linear s or vertically polarized light that is deflected by the polarization beam splitter 120 and passes through a spherical focusing lens 160 to produce a focus point that passes through a pin-hole 162 of a given size to be detected by a point high speed photo detector 167. The size of the pin-hole is selected to be approximately the diffraction limited blur spot produced by the spherical focusing lens 160 given a collimated input beam that happens when the hybrid lens 130 is tuned to produce a focused spot at the target 180. Thus, maximum optical power is registered by the photo-detector 167 when the target 180 is illuminated by a focused beam, indicating the correct distance measurement conditions to read the hybrid lens control signal n and k readings. The photo-detector 167 can be a high speed (e.g., MHz or GHz) speed device to capture the laser diode 110 temporal/frequency modulation effects used to determine distance via time-frequency processing. The pin hole 162 can also be removed and simply use the active area of the point detector as an inherent pin hole within the photo-detector 167. The linear polarizers P(s) 127 and P(p) 123 are used to polarize the transmit and receive light beams and also to reject unwanted polarization noise.

Figure 4:
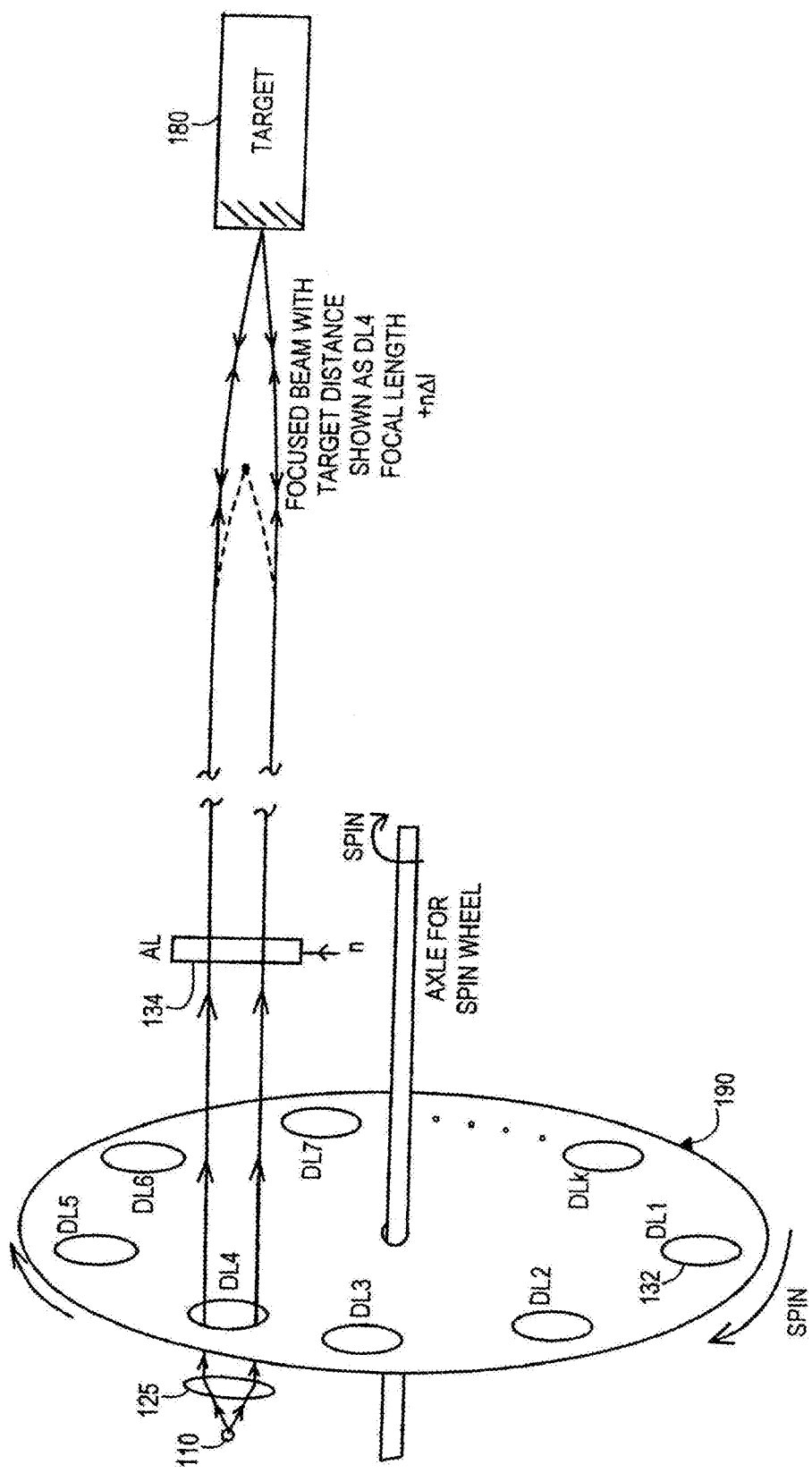
FIG. 4 shows a hybrid lens distance sensor with spinning disk digital lens system. Only the transmit module shown for simplicity.

FIG. 4 shows a hybrid lens distance sensor with spinning disk digital lens system. Only the transmit module is shown for simplicity. In this configuration, the light from the laser 110 is collimated by the collimating lens 125. A spinning disk 190 having plural fixed digital lenses 132 around the periphery of the disc 190 is positioned between the collimating lens 125 and the variable analog lens 134 that is controlled by the processor with the n-signal. The configuration includes a drive for driving the axle 195 for spinning the disk.

The disk 190 contains K bias digital lenses 132 of different focal lengths so as to cover the entire digitally controlled distance range of the sensor with K digital range bins. The lenses 192 are labeled as DL1, DL2, DL3, ..., DLK, with linearly increasing Dioptric powers. By spinning the disk to a desired lens position, a given digital lens is chosen (e.g., DL4 in FIG. 4) for light passage from/to the laser 110. After the digital 132, the analog lens 134 is positioned as shown in the preferred embodiments in FIG. 1 through FIG. 3 to cover the analog distance range equal to the digital range resolution. In FIG. 4, the target distance is digital lens DL4 focal length plus $n\Delta l$. In general, depending on the application, the digital lens 192 can be convex, concave, or special design lenses.

Figure 5:
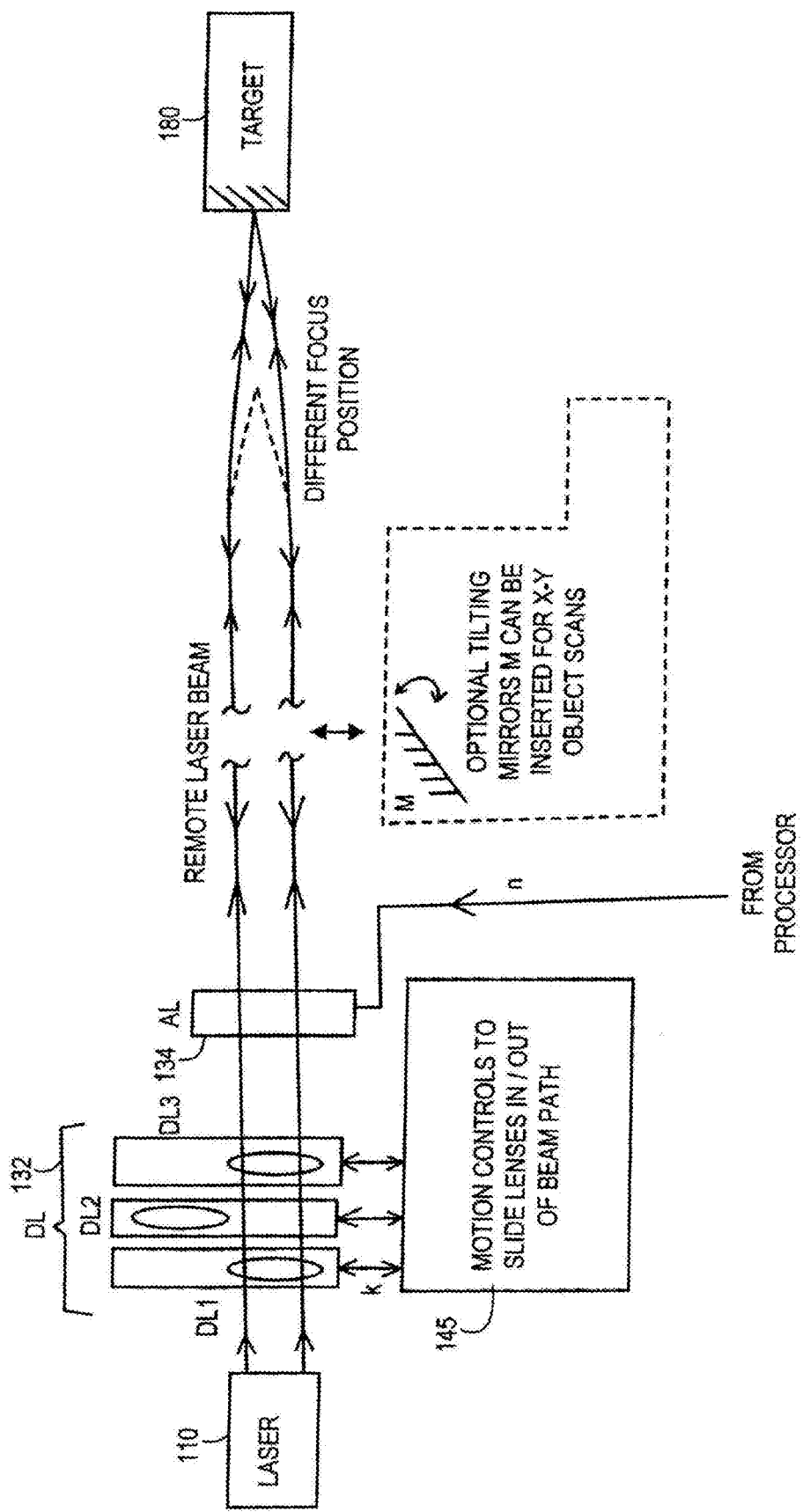
FIG. 5 show an example of a hybrid lens distance sensor with serial cascaded digital lens system. Only transmit module shown for simplicity.

Another optical configuration is shown in FIG. 5. In this configuration, the digital lens 132 of the hybrid lens distance sensor is a serial cascaded structure of digital lenses. As with FIG. 4, only the transmit mode is shown for simplicity. Compared to the FIG. 4 digital lens, the FIG. 5 digital lens system forms an efficient K-bit digital lens 132. For example as shown in FIG. 5, to get 8 digital distance (focal length) states only requires 3 independent digital lenses labeled as DL1, DL2 and DL3 arranged in a digital switching cascade. To produce the 8 different focal lengths via the digital lens system, each digital lens can be moved into or out of the laser beam path by the motion control 145 that slides the lenses in and out of the beam path, producing 8 different focal lengths. An optional tilting mirror 185 can be inserted in the optical path between the analog lens 134 and the target 180 to achieve x and y object scans.

Motion control mechanics 145 attached to the digital lenses DL1, DL2, and DL3 moves each lens in or out of the laser beam path. The dioptric powers of DL1, DL2, and DL3 are scaled in a binary step increase; e.g., DL1 has twice the lens power as DL2 and DL2 has twice the power of DL3. An optional tilting mirror 185 in the laser beam path can be used to scan the laser beam in the x-y coordinate plane of the target with z-direction being the direction of the laser beam. Again, after the digital lens 132, the variable analog lens 134 is positioned as shown in the preferred embodiments in FIG. 1 to FIG. 4 to cover the analog distance range equal to the digital range resolution.

Figure 6C:
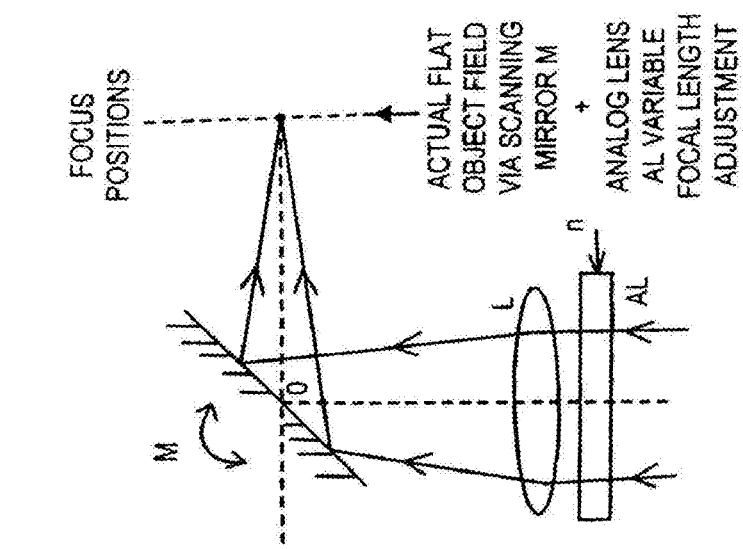
FIG. 6c shows the scanning focus system with desired flat object field using an analog lens to change focal length with changing mirror position.
Figure 6B:
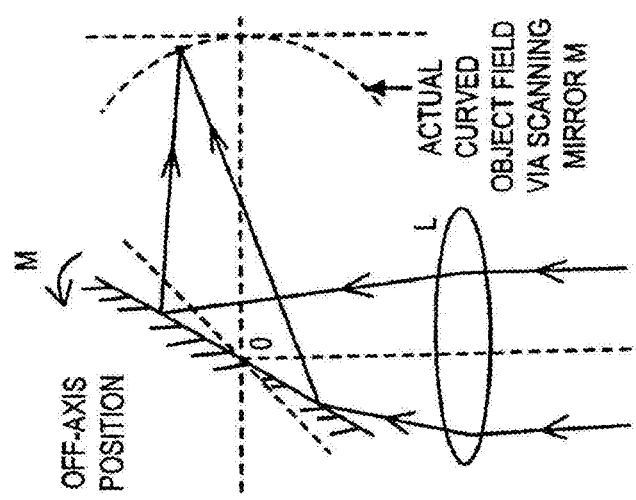
FIG. 6b shows that the scanning operation of an off-axis tilting mirror M produces a curved object field instead of flat field in a prior art lens focusing system.
Figure 6A:
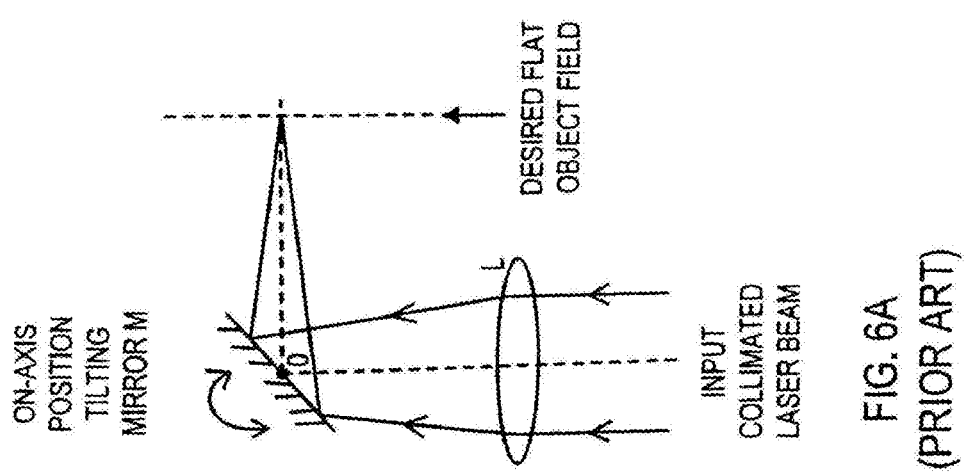
FIG. 6a shows that the scanning operation of an on-axis tilting mirror produces a desired flat object field in a prior art lens focusing system.

FIG. 5 in conjunction with FIGS. 6a and 6b show that the classic scanning operation of a tilting mirror 185 produces a curved (spherical) object field instead of flat object field in a lens focusing system. FIG. 6c shows an alternate embodiment of the present invention, a scanning focus system with desired flat object field using the variable analog lens 134 to change focal length with changing scanning mirror positions. The application of such an improved object field using the tilting mirror configuration shown in FIG. 6c can be very important and can impact the quality of many optical imaging and sampling systems where the slightest error of the desired focus position can produce severe distortion of target reconstruction. Thus, the configuration shown in FIG. 6c can for example improve laser scanning microscopes and machining and reconstruction systems. Depending on the size of the uncompensated distortion, the variable analog lens can be cascaded with a digital lens to form the preferred hybrid lens variable focal length system.

The distance sensors of the present invention can be used in a host of applications for a variety of targets. For example, these distance sensors can also be used to estimate the level of liquids as a gas-liquid interface produces a Fresnel reflection interface for a targeting beam to form a specular reflection surface. Pressure, displacement, and stress sensors can also be constructed by measuring object motion using the subject non-contact optical distance sensors. In civil engineering, building architecture, and industrial design, the proposed distance sensors can be used to monitor the health and engineering precision/quality of bridges, sky scrapers, ships, aircrafts, and other large structures. Furthermore, the proposed distance sensors can also be used on a smaller scale for micro-machined parts that may even have nano-scale structures.

These attributes of the subject distance sensor are possible as the hybrid optical sensor has both high dynamic range and high resolution distance sensing capability. Another application is in defense/military and aerospace systems that require distance measurements in hostile environments such as locating the distance of a friendly or hostile target for proper operation of munitions. In many cases, temporal/frequency modulation of a laser beam can indicate sensing activity leading to unwanted detection. Hence a temporally un-modulated laser beam such as configuration shown in FIG. 1 can benefit a high security user who wants to go un-noticed. The subject sensors assume no beam spoiling of the optical wavefront between the transmit-receive module and the target. In some cases, one may need to deploy adaptive optics to reduce beam spoiling effects on the transmit-receive wavefronts to enable a focused beam, both on the target and the receiving optical detector.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A variable focal length targeting optical device comprising:
   a lasing device to generate a laser beam;
   an optical device coupled with the lasing device to transmit the laser beam;
   a hybrid lens having a controllable digital variable focal length lens and a controllable analog variable focal length lens optically aligned with the lasing device and the optical device, at least a portion of the laser beam transmitting through the optical device and the hybrid lens toward a target;
   a processing device connected with the controllable digital and analog variable focal length lenses for controlling the variable focal length of the digital and analog lenses; and
   an optical receiver to receive the returning direct or indirect beam returned from the target, the variable focal length targeting optical device allowing remote sensing of target distance, target motion displacement, target three-dimensional structure, target spatial profile and measurement of target liquid levels.

2. The device of claim 1 wherein the optical device is a beam splitter for transmitting a portion of the laser beam to the hybrid lens toward the target and reflecting the other portion of the laser beam toward the optical receiver and receiving a reflected return beam from the target and deflecting the reflected return beam toward the optical receiver, the distance being measured from the target reflective normal incidence to the laser beam transmission exit position at the hybrid lens.

3. The device of claim 2 wherein the optical receiver comprises:
   one of a camera and an optical imager to receive the reflected portion of the laser beam from the beam splitter and the return reflected beam from the target, the return reflected beam retracing the transmit beam path.

4. The device of claim 3 wherein the optical receiver further includes a spherical focus lens between the beam splitter and the one of the camera and the optical imager to focus the portion of the laser beam reflected from the beam splitter on the one of the camera and the optical imager.

5. The device of claim 1 wherein the digital variable focal length lens has K different focal length positions and the analog variable focal length lens has N different focal length positions controlled by the processing device, the hybrid lens having K times N variable focal length positions with the digital variable focal length lens providing the distance measurement range and the analog variable focal length lens providing the distance measurement fine resolution.

6. The device of claim 1 further including a motion control device for adjusting the tip/tilt and the x-y motion stages of the variable focal length targeting optical device for three-dimensional reconstruction of the target where z is the direction of the laser beam directed toward the target.

7. The device of claim 2 wherein the optical device is a collimating lens to collimate the beam from the lasing device.

8. The device of claim 7 wherein the optical receiver is an optical camera with an imaging lens positioned to look at the target and receive a scattered light returned from the laser beam striking the target.

9. The device of claim 2 wherein the beam splitter is a polarized beamsplitter and the targeting optical device further comprises:
 a laser modulation electronics to modulate the lasing device laser beam to a modulated laser beam;
 a collimating lens and first p-polarization polarizer optically coupled between the lasing device and the beam splitter to collimate the modulated laser beam and p-polarize the collimated beam before striking the polarized beam splitter to separate the transmit and the receive channels;
 a s-polarization polarizer and spherical lens in the optical path of the optical receiver to s-polarize the reflected beam from the beamsplitter and focus the polarized reflected beam on the optical receiver; and
 a quarter-wave plate adjacent to one of the digital variable focal length lens and the analog variable focal length lens to convert the laser linear or polarized transmit beam to a circular polarized beam for transmission to the target, the returning beam from the target passing through the quarter-wave plate and deflected by the polarized beam splitter toward the optical receiver.

10. The device of claim 9 wherein the optical receiver is a photo detector for receiving the focused polarized reflected beam and focused deflected return beam from the target.

11. The device of claim 10 wherein the optical receiver further comprises a device having a pin hole aligned to receive the focused polarized reflected beam and the focused deflected return beam and pass the pin hole beam to the photo detector.

12. The device of claim 7 wherein the digital variable focal length lens consists of:
 a rotatable disk digital lens having plural different fixed digital lenses around the periphery of the rotatable disk; and
 a drive mechanism for selectively rotating the disk of digital lenses to align a selected on of the plural different fixed digital lenses in the optical path of the transmitted collimated laser beam and the return beam from the target.

13. The device of claim 1 wherein the digital variable focal length lens consists of:
 two or more serial slidable digital lenses scaled in a binary step increase; and
 a motion controller connected with the two or more slidable digital lenses to selectively slide one or more digital lenses into the laser beam path.

14. The device of claim 13 further including:
 a tilting mirror in the optical path between the hybrid lens and the target to scan the laser beam in the x and y coordinate plane of the target with z-direction being the direction of the transmitted laser beam; and
 a control mechanism for controllably tilting the tiltable mirror.

15. The device of claim 1 wherein the variable analog lens is selected from a group consisting of electrically and optically controlled liquid crystal lenses, electrically and mechanically controlled liquid lenses, and MEMS-based electrically actuated variable focus optical lenses.

16. A method to remotely sense a target distance, target displacement, target three dimensional structure, target spatial profile and a measurement of target liquid levels comprising the steps of:
 generating a laser beam directed toward the target;
 generating first control signal n and second control signal k;
 controlling a variable digital focal length and a variable analog focal length of the path of the laser beam transmitted toward the target with the first control signal n and second control signal k, respectively, where n and k vary from 1 to N and K, respectively, each combination of n and k variable control signals being a different focal length position;
 detecting at least one of a reflected portion of the laser beam and a return light from the target to determine when the transmitted laser beam illuminates the target; and
 measuring one of the target distance, target displacement, target three dimensional structure, target spatial profile and a measurement of target liquid levels according to the control signal n and the control signal k.

17. The method of claim 16 wherein the controlling step comprises the steps of:
 transmitting a portion of the laser beam toward the target subjected to the measurement;
 reflecting the other portion of the laser beam toward an optical receiver for the measurement step; and
 deflecting a reflected return beam from the target to the optical receiver for the measurement step.

18. The method of claim 17 wherein the measurement step consists of:
 monitoring the reflected laser beam to detect a minimum beam size at the optical receiver,
 monitoring the return light from the target; and
 determining the first control signal n and second control signal k to measure one of the target distance and target displacement.

19. The method of claim 16 further comprising the step of:
 varying an x and y position of the laser beam transmitted toward the target to measure one of the target three dimensional structure, target spatial profile and measurement of target liquid level where z is the direction of the laser beam directed toward the target.

* * * * *